United States Patent [19]

Fortenbery et al.

[11] Patent Number: 5,649,617
[45] Date of Patent: Jul. 22, 1997

[54] TORQUE TRANSMITTING DRIVE FOR A LIVE ROLLER CONVEYOR SYSTEM

[76] Inventors: J. David Fortenbery, 7000 Sugar Loaf Ct., Charlotte, N.C. 28217; David Erceg, 6012 Israel Dr., Concord, N.C. 28205

[21] Appl. No.: 443,582

[22] Filed: May 17, 1995

[51] Int. Cl.⁶ .................................... B65G 13/06
[52] U.S. Cl. ........................ 198/781.03; 198/781.1
[58] Field of Search .............. 198/781.03, 781.09, 198/781.1, 790

[56] References Cited

U.S. PATENT DOCUMENTS

| | | | |
|---|---|---|---|
| 4,372,442 | 2/1983 | Fleischauer | 198/790 |
| 5,005,693 | 4/1991 | Fultz et al. | 198/781.1 |

Primary Examiner—Joseph E. Valenza
Attorney, Agent, or Firm—Rhodes Coats & Bennett, L.L.P.

[57] ABSTRACT

A conveyor system including a frame having a pair of extending side rails in spaced relation to one another, a plurality of live rollers transversely mounted between the side rails, an elongated drive shaft extending between the side rails adjacent to the rollers and a torque transmitter assembly is located parallel to the drive shaft and transverse to the rollers. The torque transmitter assembly includes a continuous belt connected to at least one of the rollers and a pulley assembly adapted to rotate with respect to the drive shaft and to receive the continuous belt, whereby the rotation of the drive shaft rotates the pulley assembly and the at least one of the rollers. In the preferred embodiment, the torque transmitter assembly also includes a biasing assembly connected to the pulley assembly for maintaining the pulley assembly in position with respect to the drive shaft.

18 Claims, 2 Drawing Sheets

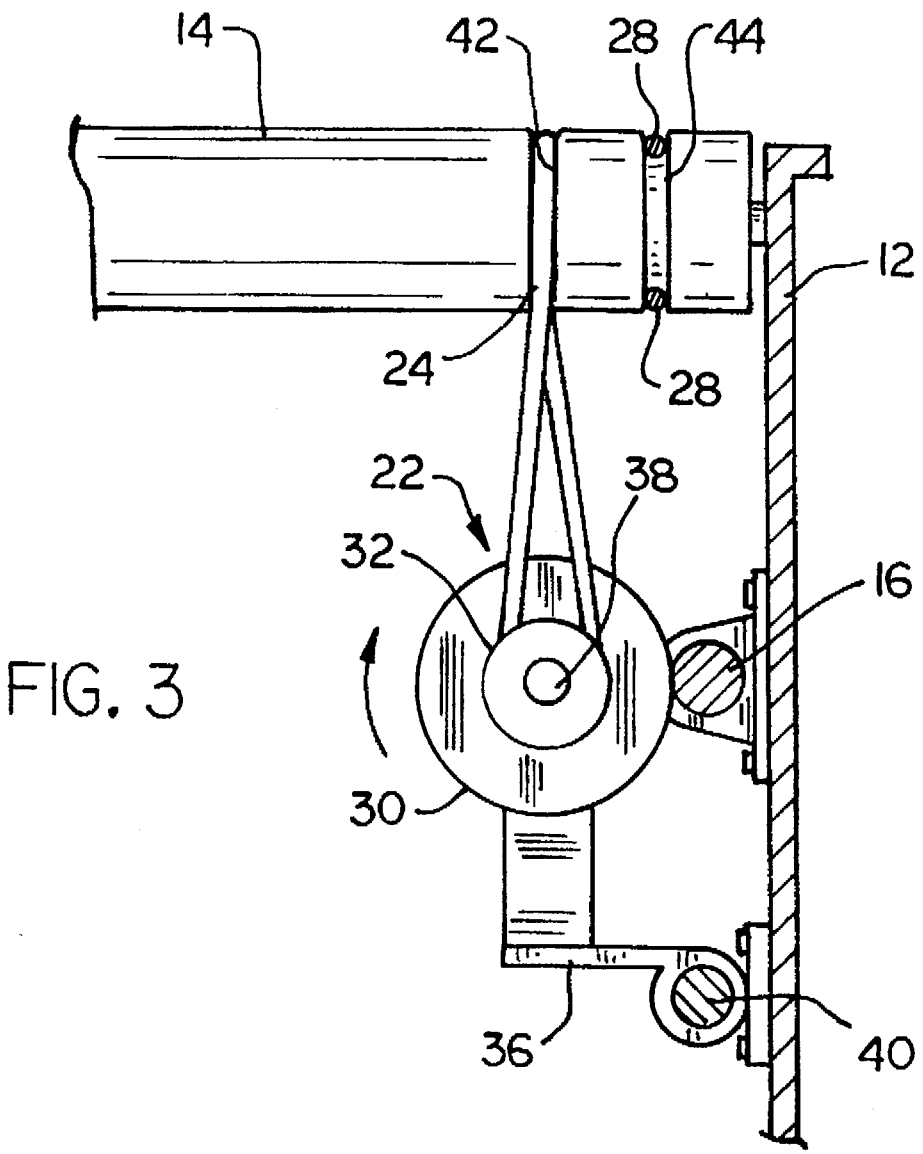

TORQUE TRANSMITTING DRIVE FOR A LIVE ROLLER CONVEYOR SYSTEM

BACKGROUND OF THE INVENTION (1) Field of the Invention

The present invention relates generally to conveyor systems and, more particularly, to an improved torque transmitting drive for a live roller conveyor system.

(2) Description of the Prior Art

Prior torque transmitting drives for live roller conveyors have been more or less successful for their intended purposes. However, these drives have been of limited utility owing to problems involving maintenance and replacement of parts. Specifically, since the elastomeric bands connecting the drive means and the individual rollers are prone to breakage, the drive means must be disassembled in order to replace each band or the band must be spliced onto the roller. This is due to the fact that the drive shaft passes through each of the endless belts as does each of the driven rollers on the conveyor. Thus, when one replaces a drive belt, the entire drive shaft must be disassembled from the conveyor system in order to loop the replacement elastomeric belt over the end of the drive shaft or the belt must be spliced which is more prone to breakage.

One simple solution to this problem has been to initially include a plurality of extra belts on the drive shaft which rotate freely and are available for use when a belt breaks. However, as will be appreciated, eventually all the belts will be used, deteriorate with age or the belts close to the broken belt will be used and the drive assembly again has to be disassembled. Thus, this is at best, a temporary solution to the problem.

Another, more successful solution is disclosed in U.S. Pat. No. 4,372,442, issued to Fleischauer. This patent discloses a torque transmitting drive having a driving member and a driven member spaced therefrom with an endless transmission belt engaging the members to transport torque from the driving member to the driven member. A bearing sleeve is slippingly mounted on the driving member over which the endless belt folds such that one strand of the belt at the fold passes over the bearing sleeve. Thus, one strand is in driving engagement with the member and the other strand moves in the opposite direction. Accordingly, when replacing belts, it is not necessary to disturb or dismantle the driving member since a new belt may be looped over the conveyor roller and folded over the drive member. However, as will be appreciated, the bearing sleeve is prone to wear and it is difficult to ensure that proper tension is applied on the elastomeric belt therefore causing premature belt wear and breakage.

Thus, there remains a need for a new and improved torque transmitting drive for a live roller conveyor which allows the endless elastomeric transmission belt to be easily replaced without disassembling the drive shaft while, at the same time, maintains the belt under proper drive tension.

SUMMARY OF THE INVENTION

The present invention is directed to a conveyor system including a frame having a pair of extending side rails in spaced relation to one another and a plurality of live rollers transversely mounted between the side rails. An elongated drive shaft extends between the side rails adjacent to the rollers. A torque transmitter assembly is located parallel to the drive shaft and transverse to the rollers. The torque transmitter assembly includes a continuous belt connected to at least one of the rollers and a pulley assembly adapted to rotate with respect to the drive shaft and to receive the continuous belt, whereby the rotation of the drive shaft rotates the pulley assembly and the at least one of the rollers. In the preferred embodiment, the torque transmitter assembly also includes a biasing assembly connected to the pulley assembly for maintaining the pulley assembly in position with respect to the drive shaft.

Accordingly, one aspect of the present invention is to provide a conveyor system. The apparatus includes: (a) a frame having a pair of extending side rails in spaced relation to one another; (b) a plurality of live rollers transversely mounted between the side rails; (c) an elongated drive shaft extending between the side rails adjacent to the rollers; and (d) torque transmitting means located parallel to the drive shaft and transverse to the rollers, the torque transmitting means including a continuous belt connected to at least one of the rollers.

Another aspect of the present invention is to provide a torque transmitter for a conveyor system having a frame having a pair of extending side rails in spaced relation to one another; a plurality of live rollers transversely mounted between the side rails; and an elongated drive shaft extending between the side rails adjacent to the rollers. The apparatus includes: (a) a continuous belt connected to at least one of the rollers; and (b) a pulley assembly located parallel to the drive shaft and transverse to the rollers and adapted to rotate with respect to the drive shaft and to receive the continuous belt, whereby the rotation of the drive shaft rotates the pulley assembly and the at least one of the rollers.

Still another aspect of the present invention is to provide a conveyor system. The apparatus includes: (a) a frame having a pair of extending side rails in spaced relation to one another; (b) a plurality of live rollers transversely mounted between the side rails; (c) an elongated drive shaft extending between the side rails adjacent to the rollers; (d) torque transmitting means located parallel to the drive shaft and transverse to the rollers, the torque transmitting means including: (i) a continuous belt connected to at least one of the rollers and (ii) a pulley assembly adapted to rotate with respect to the drive shaft and to receive the continuous belt, whereby the rotation of the drive shaft rotates the pulley assembly and the at least one of the rollers; and (e) biasing means connected to the pulley assembly for maintaining the pulley assembly in position with respect to the drive shaft.

These and other aspects of the present invention will become apparent to those skilled in the art after a reading of the following description of the preferred embodiment when considered with the drawings.

BRIEF DESCRIPTION OF THE DRAWINGS

FIG. 3 is an enlarged end view of the torque transmitting drive shown in FIG. 2.

DESCRIPTION OF THE PREFERRED EMBODIMENTS

Figure 1:
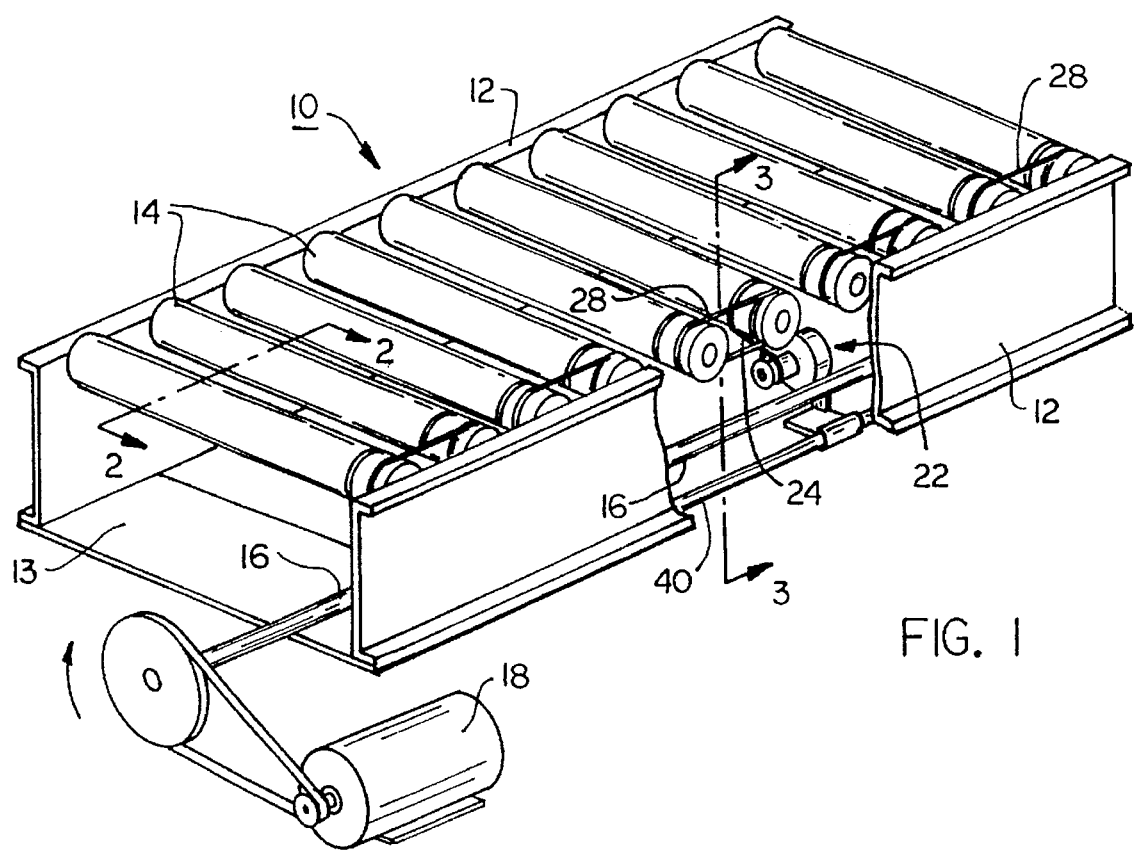
FIG. 1 is a perspective view of a live roller conveyor driven by a torque transmitting drive constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a section of a live roller conveyor system, generally designated 10 is shown constructed according to the present invention. The live roller conveyor section 10 generally comprises a frame which includes two elongated side rails 12 which are secured to each other by cross supports 13 which rigidly hold rails 12 in their space relationship.

A plurality of driven conveyor rollers 14 are transversely supported for rotation between side rails 12. Each roller is, preferably, held in place by a spring biasing means which allows each roller to be easily removed as needed. An elongated drive shaft 16 underlies the rollers 14 and is journaled to one of the elongated side rails 12 for driving rotation by means of a motor pulley combination 18.

Torque transmitting drive means, generally designated 20, includes a drive pulley assembly 22 connected between each first elastomeric belt 24 and a corresponding conveyor roller 14. Also, in the preferred embodiment, a second elastomeric belt 28 connects an adjacent conveyor roller to a directly driven conveyor roller thereby reducing the number of drive pulley assemblies 22 required. Since the conveyor rollers 14 are easily removable, the second elastomeric belt 28 can be easily replace simply by releasing the adjacent conveyor rollers 14.

Figure 2:
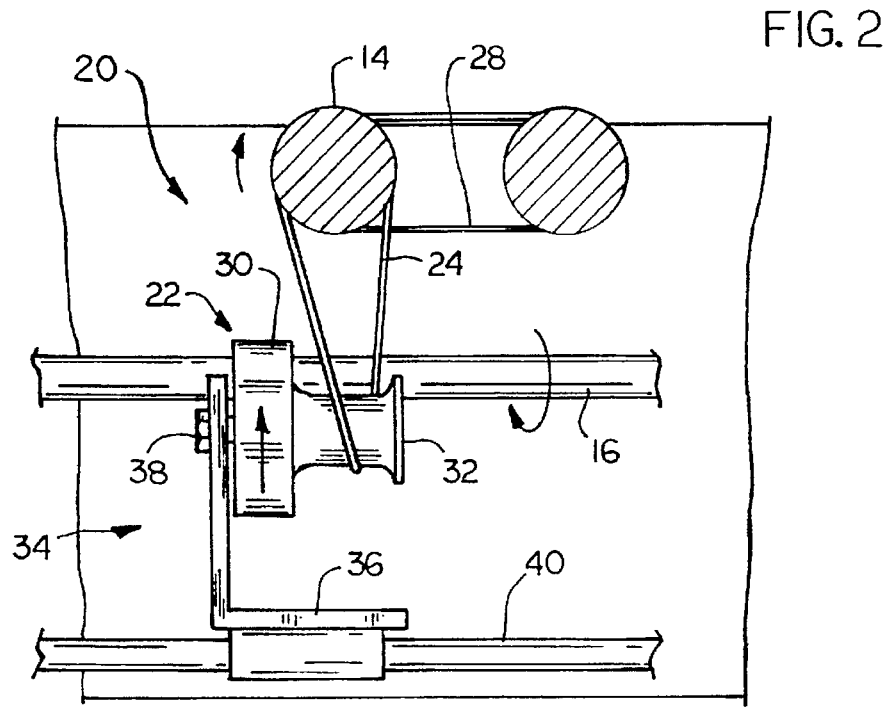
FIG. 2 is an enlarged side view of the torque transmitting drive shown in FIG. 1.

Turning to FIG. 2, there is shown an enlarged side view of torque transmitting drive 20 which includes drive pulley assembly 22 and first elastomeric belt 24. Drive pulley assembly 22 includes a roller drive 30 and a pulley drive 32. Roller drive 30 engages drive shaft 16 and is turned thereby driving pulley drive 32 which receives elastomeric belt 24 and transmits torque to roller 14. Roller drive 30 and pulley drive 32 are mounted to biasing bracket In the preferred embodiment, biasing bracket 34 includes an "L"-shaped bracket 36 which attaches drive pulley assembly 22 to the bracket by means of a bolt or shaft 38. The base "L"-shaped bracket 36 is attached to a torque rod 40 which maintains a predetermined amount of pressure between roller drive 30 and drive shaft 16.

As can be appreciated, this arrangement permits elastomeric belt 24 to be replaced without disassembling drive shaft 16 since the belt does not directly contact the drive shaft. As can be seen, in the preferred embodiment, the end of pulley drive 32 is flared or grooved to center belt 24 and prevent the elastomeric belt from accidentally disengaging itself.

As best seen in FIG. 3, there is shown an enlarged end view of the torque transmitting drive shown in FIG. 2. As can be seen, in the preferred embodiment, directly driven conveyor rollers 14 include at least one groove 42 for receiving elastic belt 24 and centering the belt. Also, in the preferred embodiment, each conveyor roller 14 also includes a second groove 44 for connecting adjacent rollers together by means of a second elastomeric belt 28 as best seen in FIG. 2.

In operation, roller drive 30 engages drive shaft 16 and is turned thereby driving pulley drive 32 which receives elastomeric belt 24 and transmits torque to roller 14. When belt 24 breaks, its paired roller stops turning, however, a new belt is installed by simply removing the spring biased roller, slipping a new belt over the roller and stretching the new belt over the end of pulley drive 32.

Certain modifications and improvements will occur to those skilled in the art upon a reading of the foregoing description. By way of example, changing the wheel material will vary the amount of force transmitted between the drive and roller. Also, a buffer sleeve, formed from a material such as a low friction plastic, can be added to the line shaft surface to allow slippage between the line shaft, sleeve and wheel to prevent heat buildup and breakage of the belt if the rollers are stopped due to accumulation. It should be understood that all such modifications and improvements have been deleted herein for the sake of conciseness and readability but are properly within the scope of the following claims.

We claim:

1. A conveyor system, said apparatus comprising:
  (a) a frame having a pair of extending side rails in spaced relation to one another;
  (b) a plurality of live rollers transversely mounted between said side rails;
  (c) an elongated drive shaft extending between said side rails adjacent to said rollers;
  (d) torque transmitting means located parallel to said drive shaft and transverse to said rollers, said torque transmitting means including a continuous belt connected to at least one of said rollers; and
  (e) a biasing means connected to said torque transmitting means for maintaining said torque transmitting means in position with respect to said drive shaft, wherein said biasing means connected to said torque transmitting means for maintaining said torque transmitting means in position with respect to said drive shaft includes a torque rod attached to said frame and a bracket attached to said torque rod and said torque transmitting means.

2. The apparatus according to claim 1, wherein said frame includes a plurality of cross braces for positioning said pair of extending side rails in spaced relation to one another.

3. The apparatus according to claim 1, wherein each of said rollers are removable.

4. The apparatus according to claim 1, wherein at least one of said rollers includes a first circumferential groove for receiving said first continuous belt connected to said torque transmitting means located parallel to said drive shaft and transverse to said rollers.

5. The apparatus according to claim 4, wherein each of said rollers includes a second circumferential groove for receiving a second continuous belt for connecting pairs of adjacent rollers to one another.

6. The apparatus according to claim 1, wherein said elongated drive shaft extending between said side rails adjacent to said rollers further includes a motor connected to a pulley for driving said drive shaft.

7. A torque transmitter for a conveyor system having a frame having a pair of extending side rails in spaced relation to one another; a plurality of live rollers transversely mounted between said side rails; and an elongated drive shaft extending between said side rails adjacent to said rollers; said apparatus comprising:
  (a) a continuous belt connected to at least one of said rollers; and
  (b) a pulley assembly located parallel to said drive shaft and transverse to said rollers and adapted to rotate with respect to said drive shaft and to receive said continuous belt, whereby the rotation of said drive shaft rotates said pulley assembly and said at least one of said rollers, wherein said pulley assembly includes a roller drive maintained in contact with said drive shaft and a pulley drive attached to said roller drive for receiving said continuous belt.

8. The apparatus according to claim 7, wherein said roller drive maintained in contact with said drive shaft is a urethane wheel.

9. The apparatus according to claim 7, wherein said pulley drive attached to said roller drive for receiving said continuous belt includes a circumferential groove to center said belt and to prevent the continuous belt from disengaging.

10. A conveyor system, said apparatus comprising:
  (a) a frame having a pair of extending side rails in spaced relation to one another;
  (b) a plurality of live rollers transversely mounted between said side rails;
  (c) an elongated drive shaft extending between said side rails adjacent to said rollers;
  (d) torque transmitting means located parallel to said drive shaft and transverse to said rollers, said torque transmitting means including: (i) a continuous belt connected to at least one of said rollers and (ii) a pulley assembly adapted to rotate with respect to said drive shaft and to receive said continuous belt, wherein said pulley assembly includes a roller drive maintained in contact with said drive shaft and a pulley drive attached to said roller drive for receiving said continuous belt, whereby the rotation of said drive shaft rotates said pulley assembly and said at least one of said rollers; and
  (e) biasing means connected to said pulley assembly for maintaining said pulley assembly in position with respect to said drive shaft.

11. The apparatus according to claim 10, wherein said frame includes a plurality of cross braces for positioning said pair of extending side rails in spaced relation to one another.

12. The apparatus according to claim 10, wherein each of said rollers are removable.

13. The apparatus according to claim 10, wherein at least one of said rollers includes a first circumferential groove for receiving said first continuous belt connected to said torque transmitting means located parallel to said drive shaft and transverse to said rollers.

14. The apparatus according to claim 13, wherein each of said rollers includes a second circumferential groove for receiving a second continuous belt for connecting pairs of adjacent rollers to one another.

15. The apparatus according to claim 10, wherein said elongated drive shaft extending between said side rails adjacent to said rollers further includes a motor connected to a pulley for driving said drive shaft.

16. The apparatus according to claim 10, wherein said biasing means connected to said pulley assembly for maintaining said pulley assembly in position with respect to said drive shaft includes a torque rod attached to said frame and a bracket attached to said torque rod and said pulley assembly.

17. The apparatus according to claim 10, wherein said roller drive maintained in contact with said drive shaft is a urethane wheel.

18. The apparatus according to claim 10, wherein said pulley drive attached to said roller drive for receiving said continuous belt includes a circumferential groove to center said belt and to prevent the continuous belt from disengaging.

* * * * *